United States Patent [19]

Tatematsu et al.

[11] Patent Number: 5,435,846
[45] Date of Patent: Jul. 25, 1995

[54] CEMENT-ADDITIVE FOR INHIBITING CONCRETE-DETERIORATION

[75] Inventors: Hidenobu Tatematsu; Tohru Nakamura; Hitoshi Koshimizu, all of Tokyo; Toshihiko Morishita; Hideki Kotaki, both of Osaka, all of Japan

[73] Assignees: Nippon Chemical Industrial Co., Ltd.; Railway Technical Research Institute, both of Tokyo, Japan

[21] Appl. No.: 199,340

[22] Filed: Feb. 18, 1994

[51] Int. Cl.⁶ .................... C04B 14/04; C04B 22/00
[52] U.S. Cl. ................ 106/813; 106/14.05; 106/14.21; 106/819
[58] Field of Search ........... 106/14.05, 14.21, 813, 106/819, 467; 502/63

[56] References Cited

U.S. PATENT DOCUMENTS

| | | | |
|---|---|---|---|
| 3,002,932 | 10/1961 | Duwell et al. | 252/179 |
| 4,435,216 | 3/1984 | Diehl et al. | 106/813 |
| 4,661,282 | 4/1987 | Clark | 106/442 |
| 4,729,853 | 3/1988 | von Bonin | 106/781 |
| 4,929,381 | 5/1990 | Clark | 106/442 |
| 5,234,498 | 8/1993 | Graves, Jr. | 106/697 |

FOREIGN PATENT DOCUMENTS

| | | | |
|---|---|---|---|
| 3132928 | 1/1983 | Germany. | |
| 61-106449 | 5/1986 | Japan | 106/813 |
| 62-021739 | 1/1987 | Japan. | |
| 63-117939 | 5/1988 | Japan. | |
| 63-117940 | 5/1988 | Japan. | |
| 63-274644 | 11/1988 | Japan. | |
| 604818 | 4/1978 | U.S.S.R. | 106/813 |
| 550814 | 6/1978 | U.S.S.R. | 106/813 |

OTHER PUBLICATIONS

CA 110: 178536 [no date].
CA 109: 235934 [no date].
CA 109: 235933 [no date].
CA 106: 161690 [no date].

*Primary Examiner*—Anthony Green
*Attorney, Agent, or Firm*—Oblon, Spivak, McClelland, Maier & Neustadt

[57] ABSTRACT

A cement additive for inhibiting concrete deterioration contains as an effective component a powder mixture of an inorganic cation exchanger, such as a highly calcium-substituted zeolite, and an inorganic anion exchanger, such as hydrocalumite. The cement additive inhibits the alkali-aggregate reaction and the corrosion of reinforcing steel, thereby protecting concrete constructions from deterioration.

7 Claims, No Drawings

CEMENT-ADDITIVE FOR INHIBITING CONCRETE-DETERIORATION

BACKGROUND OF THE INVENTION

1. Field of the Invention

The present invention relates to cement additives for inhibiting concrete-deterioration and for inhibiting the corrosion of reinforcing steel caused by chloride ions contained in the concrete and the alkali-aggregate reaction caused by alkali metal ions also contained in the concrete. More particularly, the present invention relates to cement additives containing as effective components an inorganic cation exchanger and an inorganic anion exchanger.

2. Description of the Background

Concrete is widely used in modern construction, for structures, buildings and the like because of its excellent properties and low cost achieved by mass production. It is now an indispensable construction material.

Typically, concrete contains a mixture of gravel, pebbles, sand, broken stone, blast-furnace slag or cinders, termed the aggregate, embedded in a matrix of either mortar or cement, usually Portland cement. Reinforced concrete and retro-concrete contain steel in some form.

However, construction and the like of concrete, which were once believed to be extremely strong and semipermanent, have turned out to be subject to deterioration caused by various internal and external factors. The deterioration of concrete constructions is now a serious concern.

Among the causes of deterioration of concrete, salt damage and alkali-aggregate reactions are particularly significant factors causing the deterioration of concrete. "Salt damage" is chloride ion-caused corrosion of the reinforcing steel used in concrete constructions.

Chloride ions are mainly introduced into concrete in the form of its constituent materials, that is, calcium chloridecontaining additives, which are often used in large amounts, and sea sand, which is reluctantly but increasingly used as an aggregate because river and pit sands have become scarce. Besides such internal chloride ions, external chloride ions enter the concrete of construction in the form of, for example, splashes of sea water, or a calcium chloride solution which is sprayed on roads to inhibit freezing or to melt the snow thereon.

Conventional countermeasures for salt damage have merely treated the consequences arising from the fundamental cause, that is, chloride ions. For example such countermeasures include: using of a rust preventative, such as calcium nitrite; coating a construction; and restoring or repairing a construction after deterioration is found. Although it is preferable to eliminate chloride ions from sea sand by, for example, thoroughly washing the sand, complete or even substantial elimination of chloride ions is difficult and usually costly according to the conventional art.

"Alkali-aggregate reaction" means reactions between alkali metal ions contained in cement and reactive minerals contained in an aggregate. The products of the alkali-aggregate reaction expand in the concrete causing cracks, warping, separation, etc. The concrete thus deteriorates.

To prevent or avoid the alkali-aggregate reaction, the following measures are conventionally taken:

1. Avoiding a highly reactive aggregate.
2. Using a cement having a low alkali content.
3. Using an additive having a pozzolan effect, such as blast furnace slag, fly ash or silica fume.
4. Adding salts of aluminium, zinc, etc.
5. Adding silicates such as zeolites, clay minerals, etc.
6. Waterproofing for blocking moisture.

In connection with measure 5 above, several methods have been proposed, for example:

(a) Japanese Patent Application Laid-open Nos. 62-21739, 63-117939 and 63-117940 propose a method in which 1-20 wt % of a powder or granule prepared by baking zeolite-containing green tuff or clay minerals and removing hygroscopic water and crystal water therefrom is added to a concrete.

(b) Japanese Patent Application Laid-open No. 63-274644 proposes a method in which a natural zeolite, such as clinoptirolite, loaded with calcium ions or lithium ions is added to a concrete.

Most zeolites, either natural or synthetic, are typical inorganic cation exchangers. They also have selective adsorbability. Therefore, zeolites are widely used as, for example, a detergent builder, a catalyst, an additive for synthetic resin.

Because zeolites have large cation-exchange capacity, they naturally adsorb alkali metal ions. However, use of zeolites as adsorbents of alkali metal ions has not been fully considered or studied for inhibiting concrete deterioration.

It is known that hydrocalumite is a layer crystalline compound in the form of Ca—Al double hydroxides, which is one type of bivalent-trivalent metal double hydroxides and has anion-exchange capacity. Hydrotalcite is the Mg—Adouble hydroxides, that is, another type of bivalent-trivalent metal double hydroxides. Hydrotalcite is used as a resin additive.

The prevention or delay and repair of the deterioration of concrete construction caused by various factors is now an urgent issue. However, a fundamental and practical measure has not been developed. For example, the above-mentioned removal or confinement of chloride ions in concrete is technically feasible but economically impracticable in most cases.

SUMMARY OF THE INVENTION

Accordingly, it is one object of the present invention to provide a cement additive useful for preventing or inhibiting or repairing the deterioration of concrete constructions.

It is another object of the present invention to provide cement compositions which are useful for preparing concrete constructions which are resistant to deterioration.

It is another object of the present invention to provide a method for preventing or inhibiting the deterioration of concrete.

It is another object of the present invention to provide cement compositions useful for repairing the deterioration of concrete constructions.

It is another object of the present invention to provide a method for repairing the deterioration of concrete constructions.

It is another object of the present invention to provide cured concrete constructions which are resistant to deterioration.

The present inventors have found, after intensive study on the above problems, that a mixture of an inorganic cation exchanger and: an inorganic anion exchanger has significant effect on the prevention of deterioration of concrete construction, more specifically, inhibition of the alkali-aggregate reaction and salt damage, that is, the corrosion of reinforcing steel caused by chloride ions, thus achieving the present invention.

To achieve the above objects, according to one aspect of the present invention, there is provided (a) a cement additive for inhibiting concrete deterioration containing as an effective component a mixture powder of an inorganic cation exchanger and an inorganic anion exchanger.

According to another aspect of the invention, there is provided (b) a cement additive for inhibiting concrete deterioration based on the above admixture (a), in which the inorganic cation exchanger is a calcium zeolite having a calcium substitution ratio $[2Ca^{2+}/(2Ca^{2+}+Na^{+})]$ of at least 0.9. In the formula, $Ca^{2+}$ and $Na^{+}$ are the mole numbers of the calcium and sodium ions contained in the zeolite which has been accordingly ion-exchanged.

According to still another aspect of the invention, there is provided (c) a cement additive for inhibiting concrete deterioration based on the admixture (a), in which the inorganic anion exchanger is a hydrocalumite represented by the general formula $3CaO.Al_2O_3.CaX_{2/m}.nH_2O$ wherein X is a univalent or bivalent anion; m is the number of valence thereof; and $n \leq 20$.

According to a further aspect of the invention, there is provided (d) a cement additive for inhibiting concrete deterioration based on the admixture (c), in which the hydrocalumite contains nitrite ions.

According to a yet further aspect of the invention, there is provided (e) a cement additive for inhibiting concrete deterioration based on the admixture (a), in which the amount ratio of the inorganic cation exchanger to the inorganic anion exchanger is within the range between 0.1:0.9 and 0.9:0.1.

DETAILED DESCRIPTION OF THE PREFERRED EMBODIMENTS

In the present specification, "inorganic cation exchanger" means a substance capable of ion-exchanging or adsorbing/retaining alkali ions in concrete. Typical inorganic cation exchangers are, for example, calcium-substituted natural or synthetic zeolites. The industrially preferred synthetic zeolites are zeolite A, zeolite X and a mixture thereof.

The zeolite particularly preferred according to the invention is highly calcium-substituted synthetic zeolites wherein the calcium substitution ratio $[2Ca^{2+}/(2Ca^{2+}+Na^{+})]$ is at least 0.9, and the residual sodium content is at most 2.0 wt % in terms of the weight of $Na_2O$ with respect to the dry total weight, and wherein 1 wt % zeolite aqueous slurry of the above zeolite has art equilibrium pH value at 25° C. within the range of 7.5 to 9.0.

Such a calcium-substituted zeolite used in the present invention inhibits the alkali-aggregate reaction in concrete. Naturally, the calcium-substituted zeolite should be substantially free from alkali metal ions. The calcium-substituted zeolite traps alkali metal ions in concrete by its ion-exchange reaction. Since an ion-exchange reaction is an equilibrium reaction, a calcium-zeolite may take in calcium ions and release sodium ions and/or potassium ions on some occasions. However, the use of the calcium-substituted zeolite used in the present invention should avoid such a reverse result.

According to various experiments considering such basic requirements, the present inventors have found that highly calcium-substituted zeolites having the properties stated above have excellent capacity to take in alkali metal ions.

The inorganic cation exchanger is preferably in the form of fine powder having a grain size smaller than 10 $\mu m$. This is because such fine powders facilitate rapid progress of the ion-exchange reaction and enhance the dispersibility of the cation exchanger in concrete. The grain shape of the fine powder is not particularly restricted.

"Inorganic anion exchanger", the other effective component of the cement-admixture for inhibiting concrete deterioration of the present invention, means a substance capable of an ion-exchanging or adsorbing/retaining chloride ions in concrete. Examples of the inorganic anion exchanger include: hydrocalumite, hydrotalcite and hydroxyapatite. The particularly preferred inorganic anion exchanger is a hydrocalumite, similar to a cement component, represented by the general formula $3CaO.Al_2O_3.CaX_{2/m}.nH_2O$ wherein X is a univalent or bivalent anion; m is the valence number thereof; and $n \leq 20$.

Hydrocalumites vary depending on their production-methods or their properties. The Ca/Al molar ratio is approximately 2. Although the number of n, indicating the amount of crystallization water, is normally 15 or less, this may range up to 20.

Representative anions X are, for example, $NO_3^-$, $NO_2^-$, $OH^-$, $CH_3COO^-$, $CO_3^{2-}$ and $SO_4^{2-}$. The anions particularly preferred according to the present invention are a group of univalent anions consisting of $NO_3^-$, $NO_2^-$ and $OH^-$. These univalent anions may be used alone or in combination. In the present specifications, the hydrocalumites containing the univalent anion group are respectively referred to as "$NO_3^-$-hydrocalumite", "$NO_2^-$-hydrocalumite" and "$OH^-$-hydrocalumite".

Hydrocalumites are hydrate layer-crystalline compounds which can be easily identified by the X-ray diffraction method and whose water of crystallization is released at about 300° C.

Hydrocalumites having no $Cl^-$ as the anion X, particularly, the above-mentioned $NO_3^-$, $NO_2^-$ and $OH^-$-hydrocalumites, release $NO_3^-$, $NO_2^-$ and $OH^-$ and take in $Cl^-$ at excellent ion-exchange rates when in contact with chloride ions.

The $Cl^-$-uptake of such hydrocalumites occurs in concrete and mortar substantially in the same manner. Unlike free $Cl^-$, the $Cl^-$ taken in is retained in the hydrocalumite and thus becomes inactive. The hydrocalumites thus prevent induction of corrosion of the reinforcing steel and, in addition, anions such as $NO_2^-$ actively prevent rusting of the reinforcing steel.

The inorganic anion exchanger used in the present invention is preferably in the form of powder finer than the cement power, more preferably, a fine powder having an average particle size of at most 10 $\mu m$, similar to the fine powder of the inorganic cation exchanger.

In the cement additive of the present invention, the mixing ratio of the cation exchanger to the anion exchanger is not restricted but should be suitably determined according to the properties thereof, the composition of the cement, or the requirements of the concrete.

However, it is essential to use both a cation exchanger and an anion exchanger in order to sufficiently inhibit concrete deterioration. The preferred mixing weight ratio is within the range between 0.9:0.1 and 0.1:0.9, preferably between 0.7:0.3 and 0.3:0.7. In other words, the proportion of the weight of each of the cation exchanger and the anion exchanger with respect to the total weight of the mixture thereof is preferably at least 10%.

In addition to an inorganic cation exchanger and an inorganic anion exchanger as described above, the cement additive of the present invention may further contain one or more other cement additives as desired, for example: dispersing agents, water reducing agents, hardening accelerators, hardening retarders, condensation preventatives, binders such as organic polymers, reinforcements such as short fibers, rust preventatives, rust preventing pigments, coloring agents, water repellants, or aggregates.

While the cement additive of the present invention prevents or inhibits the deterioration of concrete constructions, it also enhances the strength of the concrete. Therefore, the cement additive of the present invention has various applications, for example:

(1) Originally adding it alone or together with other additives to a cement composition so as to inhibit the deterioration of concrete.

(2) Charging it alone or together with other additives into a concrete body whose reinforcing steel is expected to be corroded by salt damage, so as to prevent or inhibit the corrosion thereof.

(3) Applying it alone or together with other additives as a crack or surface repairing agent to a concrete body whose surface has peeled or been damaged by salt damage.

When the present cement additive is added to a cement composition to effect the prevention of concrete decay, the additive may be added to any cement which is conventionally used in the construction industry. Such cements are described in *Kirk-Othmer, Encyclopedia of Chemical Technology*, 4th Ed., Wiley-Interscience, New York, pp. 564–568 (1993), which is incorporated herein by reference. In a preferred embodiment, the cement is Portland cement. In this embodiment, the cement additive is suitably added to the cement in an amount of 4 to 35 wt %, preferably 9 to 25 wt %, based on the total weight of the cement, cation exchanger and anion exchanger.

Because the cement additive of the present invention contains an inorganic cation exchanger and an inorganic anion exchanger as effective components, the admixture will readily take in and retain alkali metal ions and chloride ions from the concrete by the ion-exchange reactions, thus inhibiting the alkali-aggregate reaction and the corrosion of reinforcing steel in the concrete.

In addition, the anions, particularly $NO_2^-$, released from the anion exchanger in exchange reaction for $Cl^-$ actively prevent or inhibit the corrosion of the reinforcing steel.

Because the cement additive of the present invention has various advantageous effects on cement, it effectively prevents or inhibits the deterioration of concrete caused by the alkali-aggregate reaction or salt damage.

Other features of the invention will become apparent in the course of the following descriptions of exemplary embodiments which are given for illustration of the invention and are not intended to be limiting thereof.

EXAMPLES

1. PREPARATION OF CEMENT ADDITIVES (a) Preparation of Compound A (Highly Calcium-substituted Zeolite)

20 kg of the powder of zeolite A (Zeostar NA-100P, Nippon Chemical Industrial Co. Ltd.) containing: 17.0 wt % $Na_2O$, 27.7 wt % $Al_2O_3$, 32.9 wt % $SiO_2$, and 22.5 wt % $H_2O$, was added to 100 liter (l) of 0.1N calcium chloride aqueous solution maintained at 60° C. The ion-exchange reaction was performed for two hours under stirring. The reaction solution was immediately filtered by a Buchner funnel, and then the entire filter cake was added again to 100 l of 0.1N calcium chloride aqueous solution maintained at 60° C. to perform the second ion-exchange reaction. After filtration, 100 l of ion-exchanged water was added to the filter cake. The mixture was subjected to repulp washing and filtration three times. Then, the filter cake was thoroughly dried at 80° C. and then ground.

The chemical composition of the obtained material (hereinafter, referred to as "compound A-1") is 1.54 wt % $Na_2O$, 15.6 wt % CaO, 27.7 wt % $Al_2O_3$, 33.59 wt % $SiO_2$, 21.50 wt % $H_2O$ and 0.05 wt % Cl.

(b) Preparation of Compound B (Synthetic Hydrocalumite)

(1) $NO_3^-$-Hydrocalumite (Compound B-1)

57 kg of $Ca(NO_3)_2$ $4H_2O$ was dissolved in 60 kg of water to prepare a calcium nitrate solution (solution A).

23.4 kg of sodium aluminate solution containing 25.6 wt % $Al_2O_3$ and 21.1 wt % $Na_2O$ was mixed with 10.2 kg of a liquid NaOH solution (48%) and 293.3 kg of water to prepare a sodium aluminate solution (solution B).

Solution B was placed in a reactor. While solution B was stirred, solution A was added thereto by using a metering pump. The mixture was heated to 50 C. to promote the reaction for 4 hours followed by crystallization of the resultant gel. The molar ratios of starting materials were as follows: $CaO/Al_2O_3=4$, and $Na_2O/NO_3^-=0.30$.

After the reaction, the liquid was removed and the solid fraction was washed and then dried at 50 C. for 20 hours. The dried product was ground up to 150 mesh (compound B-1).

According to X-ray diffraction (XRD), infrared spectroscopic analysis, TG-DTA determination and chemical analysis, compound B-1 was identified as a $NO_3^-$-hydrocalumite [$3CaO.Al_2O_3.Ca(NO_3)_2.11H_2O$].

(2) $NO_3^-$-Hydrocalumite (Compound B-2)

270 ml of concentrated nitric acid, 0.68 kg of sodium aluminate solution containing 21.9 wt % $Na_2O$ and 15.0 wt % $Al_2O_3$, and 2 kg of water were added to 3.6 kg of 8.23 wt % slaked lime slurry, and the mixture was allowed to react at 50° C. for 8 hours while being stirred. Then, the mixture was treated substantially in the same manner as in the preparation of the $NO_3^-$-hydrocalumite (compound B-1) to obtain a powder (compound B-2).

According to analyses, such as XRD, compound B-2 was identified as a $NO_3^-$-hydrocalumite [$3CaO.Al_2O_3.Ca(NO_3)_2.11H_2O$] having high crystallinity.

(3) $NO_2^-$-Hydrocalumite (Compound B-3)

0.68 kg of the same sodium aluminate solution as used in the preparation of compound B-2, and 4 kg of water were added to 76 kg of 30 wt % calcium nitrite solution, and the mixture was allowed to react at 50 C. for 4 hours while being stirred. The mixture was then treated as described above to obtain a powder (compound B-3).

According to analyses, such as XRD, compound B-3 was identified as a $NO_2^-$-hydrocalumite [$3CaO.Al_2O_3.Ca(NO_2)_2.11H_2O$].

(4) $NO_3^-$-$NO_2^-$-Hydrocalumite (Compound B-4)

88 g of 30 wt % calcium nitrite solution, 11 ml of concentrated nitric acid, and 200 ml of water were added to 184 g of 8.08 wt % slaked lime slurry. Then, 68 g of the same sodium aluminate solution as used in the preparations of materials B-2 and B-3 was added to the slurry mixture at 50° C., and the mixture was allowed to react at 50° C. for 4 hours while being stirred. The mixture was then treated as described above to obtain a powder (compound B-4).

According to analyses, such as XRD, compound B-4 was identified as a $NO_3^-$-$NO_2^-$-combination-hydrocalumite [$3CaO.Al_2O_3.Ca(NO_3,NO_2)_2.11H_2O$].

(5) $NO_3^-$-$NO_2^-$-Hydrocalumite (Compound B-5)

1.0 kg of compound B-2 was added to 3.0 kg of water to obtain a slurry. 310 g of sodium nitrite ($NaNO_2$, first class grade chemical) was added to the slurry, followed by anion-exchange at a room temperature (13° C.) for 8 hours. The solid fraction was separated from the liquid fraction by using a Buchner funnel. The solid fraction was suspended in 10 kg of ion-exchanged water and thus repulp-washed. After performing the repulp-washing twice, the solid fraction was dried at 60 C. for 48 hours and then ground to obtain compound B-5).

(6) $NO_3^-$-$NO_2^-$-Hydrocalumite (Compound B-6)

Compound B-6 was prepared substantially in the same manner as compound B-5 was prepared, except that the anion-exchange step was performed twice.

(c) Preparation of Cement Additives According to the Invention

Compound A was mixed with various compounds B to obtain cement additives according to the present invention, as shown in Table 1.

TABLE 1

| Cement Additive | VARIOUS CEMENT ADDITIVES | | A-B Weight Ratio |
|---|---|---|---|
| | Compound A | Compound B | |
| No. 1 | A-1 | B-2 ($NO_3^-$) | 100:100 |
| No. 2 | A-1 | B-3 ($NO_2^-$) | 100:100 |
| No. 3 | A-1 | B-5 ($NO_2^-$ <$NO_3^-$) | 100:100 |
| No. 4 | A-1 | B-6 ($NO_2^-$ >$NO_3^-$) | 100:100 |

2. EVALUATION OF CONCRETE-DETERIORATION INHIBITORY EFFECTS

Cement additive No. 2 was used to prepare mortar specimens for evaluation on inhibition of the alkali-aggregate reaction and salt damage. The test methods and results were as follows.

(a) Preparation of Steel-reinforced Mortar Specimens

According to JIS A5308, mortar specimens were prepared as follows. 120 g of cement additive No. 2 was added to a mixture of 600 g of ordinary Portland cement and 350 g of a fine aggregate (crushed stone produced in Ariake, Japan, having a specific gravity of 2.54, a water absorption coefficient of 0.8 wt %, a fineness modulus of 3.19 and a grain-size combination ratio of 4.75–2.83 mm:2.83–1.16 mm:1.16:0.6 mm:0.6:0.3 mm=0:25:25:15). The resultant mixture was mixed by a kneader for 30 seconds.

Other mortar specimens were prepared by using substantially the same components in the same manner as described above, except that no cement addtives according to the invention was added thereto.

As indicated in Table 2, mortar specimen Nos. 2 and 4 contained cement additive No. 2, and mortar specimen Nos. 1 and 3 contained no cement additives according to the invention.

After specimens Nos. 1 to 4 were prepared, 330 g of 1.5 wt % and 3.0 wt % NaCl aqueous solution were added to each of specimens Nos. 1, 2 and each of specimens Nos. 3, 4, respectively. Then, each of the mortar mixtures was kneaded for 30 seconds, allowed to stand for 20 seconds, and then mixed twice or three times by using a spoon.

After being kneaded for 120 seconds, each mortar specimen was charged into a mold (having a width of 40 mm, a length of 160 mm and a depth of 40 mm) up to about half the depth. A pretreated SS41 steel bar ($\phi$10 mm × 100 mm) is slowly placed on a substantially central position of each mortar specimen so as to lie parallel to the bottom of the mold. Then, the molds were filled with the respective mortar specimens. 24 hours later, the mortar specimens were taken out of the molds, and then cured at 20°±3° C. for a day.

(b) Test Method and Evaluation

After the constant-temperature curing, the specimens were placed in a neutralization promoting tester (Environmental Chambers, Asahi Kagaku Co., Ltd.), in which carbonation of the specimens were promoted in the presence of carbon dioxide gas under the following conditions:

Carbon dioxide ($CO_2$) gas concentration: 20 vol %
Temperature: 30° C.
Humidity: 40% (relative humidity)
Duration: 28 days After having been placed in the neutralization promoting tester for 28 days, the steel-reinforced mortar specimens were subjected to dry-wet cycles at a rate of two cycles a week for a period of 8 weeks. As well as observation of the exteriors of the specimens, corroded areas and weights of the steel bars in the specimens were measured according to "Japan Concrete Engineering Institution: Standard and Test Methods of Corrosion and Corrosion Protection of Concrete Structure (1987)". The results are shown in Table 2. According to the observation, the specimens containing cement additive No. 2 according to the invention had clearly less cracking than the specimens containing no additive according to the invention.

TABLE 2

| Mortar Specimen | Ion Exchanger* (%) | | Water-Cement Ratio | NaCl Added* (%) | | Corroded Area ($mm^2$) | | Corrosion-Reduced Weight (mg) | | Average Corrosion Depth ($mg/mm^2$) |
|---|---|---|---|---|---|---|---|---|---|---|
| | A-1 | B-3 | | $Na_2O$ | Cl | Measurement | Ave. | Measurement | Ave. | |
| No. 1 | | | 55 | 0.40 | 0.50 | 218 | | 10.4 | | |
| | | | 55 | 0.40 | 0.50 | 425 | 322 | 14.2 | 12.3 | 0.038 |
| No. 2 | 10 | 10 | 55 | 0.40 | 0.50 | 6 | | <0.1 | | |
| | 10 | 10 | 55 | 0.40 | 0.50 | 8 | 7 | <0.1 | <0.1 | — |
| No. 3 | | | 55 | 0.80 | 1.0 | 1152 | | 53.1 | | |
| | | | 55 | 0.80 | 1.0 | 1626 | 1389 | 46.0 | 49.6 | 0.036 |
| No. 4 | 10 | 10 | 55 | 0.80 | 1.0 | 13 | | <0.1 | | |

TABLE 2-continued

| Mortar Specimen | Ion Exchanger* (%) A-1 | Ion Exchanger* (%) B-3 | Water-Cement Ratio | NaCl Added* (%) Na$_2$O | NaCl Added* (%) Cl | Corroded Area (mm$^2$) Measurement | Corroded Area (mm$^2$) Ave. | Corrosion-Reduced Weight (mg) Measurement | Corrosion-Reduced (mg) Ave. | Average Corrosion Depth (mg/mm$^2$) |
|---|---|---|---|---|---|---|---|---|---|---|
| | 10 | 10 | 55 | 0.80 | 1.0 | 68 | 41 | 4.7 | 2.4 | — |

*Proportions to the amounts of cement to which the components were added.

As understood from the above description, the cement additive for inhibiting concrete deterioration of the present invention inhibits alkali-aggregation reactions and corrosion of reinforcing steel, thereby protecting concrete constructions from deterioration.

Obviously, numerous modifications and variatins of the present invention are possible in light of the above teachings. It is therefore to be understood that, within the scope of the appended claims, the invention may be practiced otherwise than as specifically described herein.

What is claimed is:

1. A cement additive for inhibiting concrete deterioration, consisting essentially of (i) an inorganic cation exchanger which is a calcium zeolite having a calcium substitution ratio, $2Ca^{2+}/(2Ca^{2+}+Na^+)$, of at least 0.9 and (ii) an inorganic anion exchanger which is a hydrocalumite represented by the general formula $3CaO.Al_2O_3.CaX_{2/m}.nH_2O$ wherein X is an ion selected from the group consisting of $NO_2^-$, $NO_3^-$, $OH^-$, $CO_3^{2-}$ and $SO_4^{2-}$; m is a valence number of X; and $n \leq 20$, wherein the weight ratio of said (i) calcium zeolite to said (ii) hydrocalumite is within the range between 0.1:0.9 and 0.9:0.1.

2. The cement additive of claim 1 wherein the calcium zeolite is a calcium zeolite A.

3. The cement additive of claim 1 wherein the hydrocalumite contains $NO_2^-$.

4. A cement composition inhibiting concrete deterioration, comprising:
   (a) a cement powder; and
   (b) a cement additive consisting essentially of (i) an inorganic cation exchanger which is a calcium zeolite having a calcium substitution ratio, $2Ca^{2+}/(2Ca^{2+}+Na^+)$, of at least 0.9 and (ii) an inorganic anion exchanger which is a hydrocalumite represented by the general formula $3CaO.Al_2O_3.CaX_{2/m}.nH_2O$ wherein X is an ion selected from the group consisting of $NO_2^-$, $NO_3^-$, $OH^-$, $CO_3^{2-}$ and $SO_4^{2-}$; m is a valence number of X; and $n \leq 20$, wherein the weight ratio of said (i) calcium zeolite to said (ii) hydrocalumite is within the range between 0.1:0.9 and 0.9:0.1, and wherein said additive is present in said cement composition in an amount of 4 to 35 wt % based on the total weight of said cement.

5. A method of inhibiting or repairing concrete deterioration, comprising charging or applying said cement composition of claim 4 to a concrete crack or to a concrete body whose surface has peeled or been damaged.

6. The method of claim 5, wherein said calcium zeolite is a calcium zeolite A.

7. The method of claim 5, wherein said hydrocalumite contains $NO_2^-$.

* * * * *